US008439788B2

(12) United States Patent
Fujii et al.

(10) Patent No.: US 8,439,788 B2
(45) Date of Patent: May 14, 2013

(54) VEHICLE DIFFERENTIAL UNIT

(75) Inventors: Noriyuki Fujii, Woluwe-Saint-Lambert (BE); Makoto Nishiji, Woluwe-Saint-Lambert (BE)

(73) Assignee: JTEKT Corporation, Osaka-shi (JP)

( * ) Notice: Subject to any disclaimer, the term of this patent is extended or adjusted under 35 U.S.C. 154(b) by 388 days.

(21) Appl. No.: 12/710,617

(22) Filed: Feb. 23, 2010

(65) Prior Publication Data

US 2010/0240487 A1      Sep. 23, 2010

(30) Foreign Application Priority Data

Mar. 23, 2009   (JP) ................. 2009-070027

(51) Int. Cl.
  *F16H 48/20* (2012.01)
  *F16H 57/08* (2006.01)
  *F16H 48/22* (2006.01)

(52) U.S. Cl.
  USPC ................ 475/249; 475/338; 475/344

(58) Field of Classification Search .............. 475/220, 475/248–250, 338, 344
  See application file for complete search history.

(56) References Cited

U.S. PATENT DOCUMENTS

| 5,527,229 | A | 6/1996 | Ishihara et al. | |
|---|---|---|---|---|
| 7,086,985 | B2 * | 8/2006 | Nakajima | 475/248 |
| 7,097,585 | B2 * | 8/2006 | Nishiji | 475/248 |
| 7,404,780 | B2 * | 7/2008 | Kushino | 475/252 |
| 8,057,352 | B2 * | 11/2011 | Nishiji | 475/344 |
| 2004/0214683 | A1 * | 10/2004 | Yoshiyama et al. | 475/344 |
| 2005/0054472 | A1 | 3/2005 | Nishiji | |
| 2005/0090359 | A1 * | 4/2005 | Kai et al. | 475/248 |
| 2005/0266954 | A1 * | 12/2005 | Yoshimura | 475/249 |
| 2006/0100054 | A1 | 5/2006 | Maruyama et al. | |
| 2006/0281599 | A1 | 12/2006 | Murakami et al. | |

FOREIGN PATENT DOCUMENTS

| EP | 0 405 717 A1 | 1/1991 |
|---|---|---|
| JP | 8-152055 | 6/1996 |
| JP | 2003-207026 | 7/2003 |
| JP | 2005-16643 | 1/2005 |

OTHER PUBLICATIONS

Konstantin Erjawetz, et al., "Double Differential Unit with Torque Sensing Locking Device", SAE Paper No. 2005-26-067, XP002590489, Jan. 19, 2005, pp. 741-747.

* cited by examiner

*Primary Examiner* — David D Le
*Assistant Examiner* — Jacob S Scott
(74) *Attorney, Agent, or Firm* — Oblon, Spivak, McClelland, Maier & Neustadt, L.L.P.

(57) ABSTRACT

In a vehicle differential unit according to an embodiment of the invention, a planetary carrier that is a rotatable member that rotatably supports planetary gears is formed of cylindrical members that are unable to rotate relative to each other on the rotational axis of a pair of output shafts. The vehicle differential unit has a thrust force generation portion that receives a driving force from a drive source of a vehicle and generates a thrust force along the direction of the rotational axis of the pair of output shafts, and a relative movement limiting portion that limits a relative movement between the cylindrical members along the axial direction due to the thrust force when the vehicle is in the drive mode.

5 Claims, 4 Drawing Sheets

VEHICLE DIFFERENTIAL UNIT

INCORPORATION BY REFERENCE

The disclosure of Japanese Patent Application No. 2009-070027 filed on Mar. 23, 2009 including the specification, drawings and abstract is incorporated herein by reference in its entirety.

BACKGROUND OF THE INVENTION

1. Field of the Invention

The invention relates generally to a vehicle differential unit, and more specifically to a vehicle differential unit that includes a support member that rotatably supports a gear member.

2. Description of the Related Art

For example, Japanese Patent Application Publication No. 2005-16643 describes an existing vehicle differential unit that includes: a housing having a planetary carrier that rotatably houses and supports planetary gears and that serves as an input member; an internal gear that meshes with the planetary gears in the planetary carrier and that serves as a first output member; and a sun gear that is coaxial with the internal gear, that meshes with the planetary gears and that serves as a second output member.

The housing receives a torque from an engine of a vehicle and rotates together with the planetary carrier, and the rotational force is transmitted from the planetary carrier to the sun gear and the internal gear via the planetary gears.

The internal gear has helical splines that mesh with a coupling. The internal gear receives the rotational force of the planetary gears and rotates, and then transmits the rotational force to the coupling.

The coupling has helical splines that form a thrust force generation portion together with the helical splines of the internal gear, and transmits the rotational force from the internal gear to a rear axle (output shaft).

The sun gear receives the rotational force of the planetary gears and rotates, and then transmits the rotational force to a front axle (output shaft).

With the structure described above, when the torque from the engine of the vehicle is input in the housing, the housing rotates about its rotational axis. When the housing rotates, the rotational force is transmitted to the planetary gears via the planetary carrier, and then transmitted from the planetary gears to the internal gear and the sun gear.

In this case, when the vehicle travels straight, a front drive wheel and a rear drive wheel rotate at the same speed. Therefore, the planetary gears mesh with the sun gear and the internal gear and do not rotate relative to the sun gear and the internal gear. As a result, the entirety of the differential unit revolves around the rotational axis of the housing.

On the other hand, when a difference in the rotational speed between front drive wheel and the rear drive wheel is caused, for example, when the vehicle goes round a curve, the planetary gears rotate about their axes within the planetary carrier while revolving around the rotational axis of the housing so as to adjust the difference in the rotational speed. That is, the planetary gears rotate on their axes so that the rotational speed of one of the sun gear and the internal gear is increased and the rotational speed of the other of the sun gear and the internal gear is reduced, whereby the differential function is performed.

When a difference in the grip force between the front drive wheel and the rear drive wheel is caused, the differential limiting operation is performed using the friction force generated due to the thrust force that is generated by the mesh of the planetary gears with the sun gear and the internal gear or using the friction force generated between the tooth tip faces of the planetary gears and the gear support face of the planetary carrier. At this time, the differential limiting force is amplified or reduced by the thrust force that is generated at the thrust force generation portion between the internal gear and the coupling.

However, with the vehicle differential unit according to JP-A-2005-16643, when the vehicle is in the drive mode or the coast mode, a thrust force is generated at the thrust force generation portion, and the differential limiting force is increased or reduced. Therefore, it is not possible to make an adjustment of the differential limiting function (bias ratio) that is limited to one of the drive mode and the coast mode.

For example, if the locking factor performance in the coast mode is as high as that in the drive mode, the differential limiting force exerts an influence on the operation of a so-called anti-lock brake system that prevents locking of a wheel when the vehicle is decelerated by a brake, for example, on a road having a low frictional coefficient $\mu$. As a result, the performance of the anti-lock brake system may not be sufficiently delivered. Also, in a vehicle provided with a vehicle behavior stabilization control device that corrects an unstable behavior of the vehicle that may occur while the vehicle is making a turn or a device that prevents spinning of a wheel during sudden acceleration, if the locking factor in the drive mode is increased, the differential limiting force interferes with the operations of these devices. As a result, these devices may not sufficiently deliver their performance. Even if a vehicle is not provided with these devices, it is preferable that the locking factor differs between the coast mode that is mainly selected when the vehicle travels straight and the drive mode that is frequently selected when the vehicle goes through a curve. That is, the locking factor in the drive mode and the locking factor in the coast mode have respective optimum values based on the structure of the vehicle. In order to achieve the optimum values, the locking factor in the drive mode and the locking factor in the coast mode need to be made different from each other. However, in the above-described existing vehicle differential unit, such a measure is not taken.

SUMMARY OF THE INVENTION

It is an object of the invention to provide a vehicle differential.

An aspect of the invention relates to a vehicle differential unit that includes a first gear member rotatably supported by a support member formed of a rotatable member, and a second gear member and a third gear member that mesh with the first gear member, and that distributes a driving force from a drive source of a vehicle to a pair of output shafts via the first gear member, the second gear member, the third gear member, and the support member. At least one of the support member, the second gear member and the third gear member is formed of a plurality of separate elements that are unable to rotate relative to each other on the axis of the pair of output shafts. The vehicle differential unit has a thrust force generation portion that receives the driving force and generates a thrust force along the axial direction of the pair of output shafts between the plurality of elements, and a relative movement limiting portion that limits the relative movement between at least two adjacent elements among the plurality of elements along the axial direction due to the thrust force when the vehicle is in one of the drive mode and the coast mode.

With the structure described above, it is possible to make an adjustment of the bias ratio that is limited to one of the drive mode and the coast mode.

BRIEF DESCRIPTION OF THE DRAWINGS

The foregoing and further features and advantages of the invention will be come apparent from the following description of an example embodiment with reference to the accompanying drawings, wherein like numerals are used to represent like elements and wherein.

DETAILED DESCRIPTION OF THE EMBODIMENT

Figure 1:
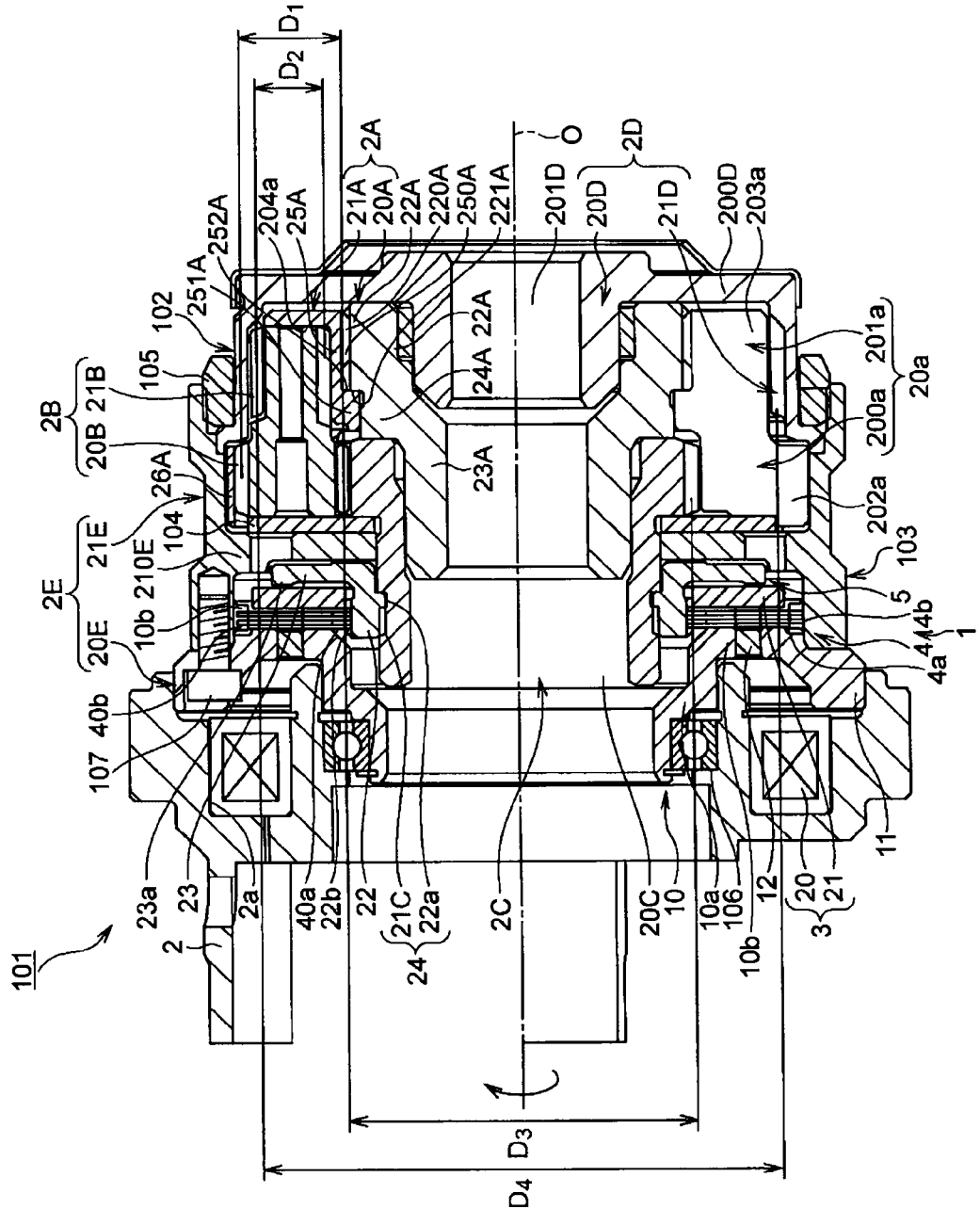
FIG. 1 is a cross-sectional view showing the entirety of a vehicle differential unit according to an embodiment of the invention.
Figure 2:
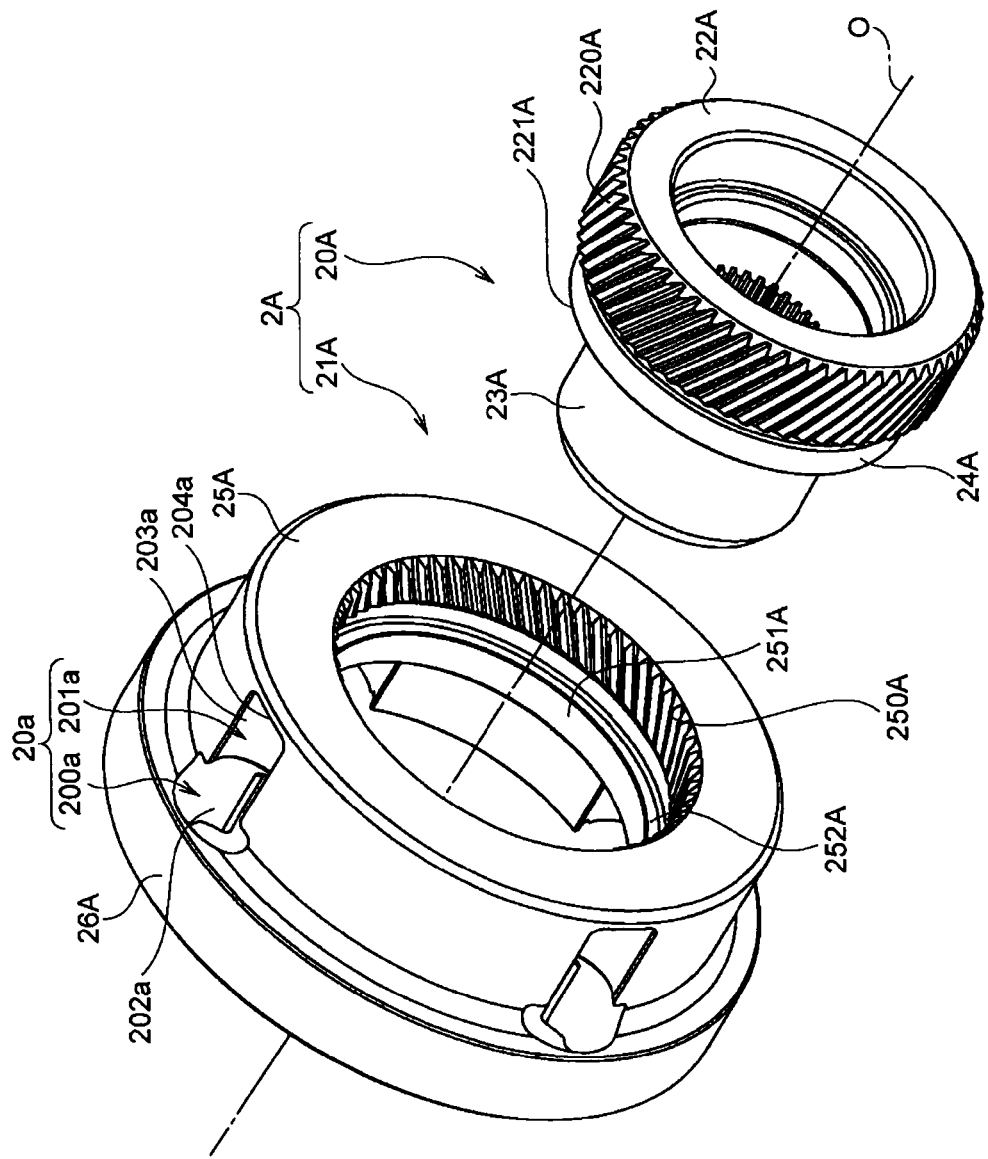
FIG. 2 is an exploded perspective view for describing a support member of the vehicle differential unit according to the embodiment of the invention.

Hereafter, a vehicle differential unit according to an embodiment of the invention will be described with reference to FIGS. 1 and 2. FIG. 1 is a cross-sectional view showing a vehicle differential unit taken along the rotational axis of a differential case. FIG. 2 is a view showing a planetary carrier of the vehicle differential unit.

The overall structure of the vehicle differential unit will be described below. A vehicle differential unit 101 shown in FIG. 1 is used as a center differential unit that distributes the driving force from a drive source of, for example, a four-wheel drive vehicle to a front wheel-side differential device (not shown) and a rear wheel-side differential device (not shown). The vehicle differential unit 101 mainly includes a differential mechanism 102 that differentially-distributes the drive torque (engine torque) from the drive source to paired front wheel-side output shaft (not shown) and rear wheel-side output shaft (not shown), and a differential limiting mechanism 103 that limits the differential function of the differential mechanism 102.

The structure of the differential mechanism 102 will be described below. The differential mechanism 102 includes: a planetary carrier (input member) 2A that serves as a support member; a plurality of planetary gears (input-side gears) 2B (only one of which is shown) that receive the rotational force of the planetary carrier 2A and that serve as first gear members; a sun gear (first output-side gear) 2C that meshes with the plurality of planetary gears 2B and that serves as a second gear member; an internal gear (second output-side gear) 2D that is coaxial with the sun gear 2C, that meshes with the plurality of planetary gears 2B, and that serves as a third gear member; and a differential case 2E that houses the internal gear 2D, the sun gear 2C, the planetary carrier 2A and the plurality of planetary gears 2B.

The structure of the planetary carrier 2A will be described below. The planetary carrier 2A is disposed between the sun gear 2C and the internal gear 2D, and rotatably arranged on the rotational axis O of the differential case 2E. The entirety of the planetary carrier 2A is formed of two separate cylindrical members, that is, an inner cylindrical member 20A and an outer cylindrical member 21A that differ in the outer diameter.

The cylindrical member 20A includes cylindrical portions 22A to 24A that differ in the outer diameter, and is arranged on the inner peripheral side of the planetary carrier 2A. The cylindrical portion 22A is arranged in the internal gear 2D (shown in FIG. 1), and the cylindrical portion 23A is arranged on the inner periphery of the sun gear 2C (shown in FIG. 1). The cylindrical portion 24A is interposed between the cylindrical portion 22A and the cylindrical portion 23A.

Helical splines 220A are formed in the outer peripheral face of the cylindrical portion 22A. The helical splines 220A form a helical gear that is disposed between an inner flange 251A (described later in detail) of the cylindrical member 21A and the internal gear 2D.

The cylindrical portion 22A has a second contact face 221A that faces a first contact face 252A (described later in detail) of the inner flange 251A of the cylindrical member 21A.

The cylindrical member 21A is formed of a base portion 25A and a rib portion 26A, and interposed between the sun gear 2C and the internal gear 2D. The entirety of the cylindrical member 21A is formed of cylindrical members that differ in the inner diameter and the outer diameter and that are arranged in a stepwise pattern.

The base portion 25A is formed of a cylindrical member that opens at its ends in the direction of the rotational axis O of the planetary carrier 2A.

Helical splines 250A are formed in the inner peripheral face of the base portion 25A. The helical splines 250A mesh with the helical splines 220A of the cylindrical member 20A. Together with the helical splines 220A, the helical splines 250A form a thrust force generation portion that receives the driving force from a drive source (not shown) of the vehicle and generates a thrust force along the axial direction. Thus, when the torque is transmitted between the cylindrical members 20A and 21A, a thrust force along the rotational axis O is generated between the cylindrical members 20A and 21A by the thrust force generation portion (helical splines 220A and 250A).

The inner flange 251A is formed on the inner peripheral face of the base portion 25A. The inner flange 251A projects in the radial direction. Together with the cylindrical portion 22A, the inner flange 251A forms a relative movement limiting portion that limits the relative movement between the cylindrical members 20A and 21A along the rotational axis O that may be caused by the thrust force that is generated between the helical splines 220A and 250A when the vehicle is in the drive mode or the coast mode.

In this specification, the drive mode signifies a mode that is selected when the torque used to move the vehicle forward is transmitted from the engine side to a pair of axles. Also, the coast mode signifies a mode that is selected when the torque used to move the vehicle forward is transmitted from the pair of axles to the engine side.

In the embodiment, if a thrust force that is applied in such a direction that the relative movement between the cylindrical members 20A and 21A is limited is generated at the thrust force generation portion, for example, when the vehicle is in the drive mode, it is possible to cancel the effect of increasing the differential limiting torque due to the thrust force along the rotational axis O that is generated at the planetary gears 2B, the sun gear 2C and the internal gear 2D.

On the other hand, if a thrust force that is applied in such a direction that the relative movement between the cylindrical members 20A and 21A is permitted is generated at the thrust force generation portion when the vehicle is in the coast mode, it is possible to obtain the effect of increasing the differential limiting torque due to the thrust force along the rotational axis O that is generated at the planetary gears 2B, the sun gear 2C and the internal gear 2D.

The inner flange 251A has the first contact face 252A that contacts the second contact face 221A in the axial direction when the relative movement between the cylindrical members 20A and 21A is limited by the relative movement limiting portion. Thus, the first contact face 252A and the second contact face 221A are brought into contact with each other, which makes it possible to limit the relative movement between the cylindrical members 20A and 21A along the rotational axis O due to the thrust force that is generated between the helical splines 220A and 250A when the vehicle is in the drive mode or the coast mode.

The rib portion 26A is formed of an annular member that is connected to the base portion 25A, and that opens at its ends in the direction of the rotational axis O of the planetary carrier 2A. The outer diameter of the rib portion 26A is set to a value greater than the outer diameter of the base portion 25A, and the inner diameter of the rib portion 26A is set to a value greater than the inner diameter of the base portion 25A.

The planetary carrier 2A has gear housing-supporting portions 20a that rotatably house and support the planetary gears 2B (shown in FIG. 1).

Each gear housing-supporting portion 20a is formed of a first housing hole 200a and a second housing hole 201a, and lies astride the base portion 25A and the rib portion 26A.

The first housing hole 200a opens inward in the radial direction of the planetary carrier 2A (opens at the inner peripheral face of the rib portion 26A), and opens at both sides in the direction parallel to the rotational axis O. The first housing hole 200a is formed in the rib portion 26A.

The inner peripheral faces (torque transmission faces) that define the respective first housing holes 200a are formed of first gear support faces 202a that have such a curvature that the first gear support faces 202a conform with the tooth tip faces of gear portions 20B (described later in detail) of the planetary gears 2B.

The second housing hole 201a opens outward in the radial direction of the planetary carrier 2A (opens at the outer peripheral face of the base portion 25A), and opens at one side in the direction parallel to the rotational axis O. The second housing hole 201a is communicated with the first housing hole 200a, and is formed in the base portion 25A.

The inner peripheral faces (torque transmission faces) that define the respective second housing holes 201a are formed of second gear support faces 203a that have such a curvature that the second gear support faces 203a conform with the tooth tip faces of gear portions 21B (described later in detail) of the planetary gears 2B. The bottom faces that define the second housing holes 201a are formed of third gear support faces 204a that slidably support the axial end faces (free end faces) of the gear portions 21B of the planetary gears 2B.

The structure of the planetary gears 2B will be described below. As shown in FIG. 1, each planetary gear 2B is formed of a helical gear that have the large and small two gear portions 20B and 21B that have the pitch circle diameter D1 and the pitch circle diameter D2, respectively, which differ from each other (D1>D2) (helical direction is the same) (the gear portion 20B has a gear specification of the pitch circle diameter D1, and the gear portion 21B has a gear specification of the pitch circle diameter D2). The planetary gears 2B are rotatably housed in the first housing holes 200a and the second housing holes 201a of the planetary carrier 2A.

The gear portions 20B mesh with the sun gear 2C, and are housed in the first housing holes 200a. In addition, the gear portions 20B are configured to transmit the rotational force of the planetary carrier 2A to the output shaft in the left side of FIG. 1 (output shaft connected to the front axle) via the sun gear 2C.

An annular thrust washer 104 positioned on the outer periphery of the sun gear 2C is disposed between the axial end faces (free end faces) of the gear portions 20B and an inner flange 210E of the differential case 2E (a rear case 21E).

The number of teeth (hereinafter, referred to as "teeth number") Z1 of each gear portion 20B is set to be greater than the teeth number Z2 of each gear portion 21B (Z1>Z2).

The gear portions 21B mesh with the internal gear 2D, and are housed in the second housing holes 201a. The gear portions 21B are configured to transmit the rotational force of the planetary carrier 2A to the output shaft in the right side of FIG. 1 (output shaft connected to the rear axle) via the internal gear 2D.

The structure of the sun gear 2C will be described below. The sun gear 2C meshes with the gear portions 20B of the planetary gears 2B, is arranged so as to be rotatable on the rotational axis O of the internal gear 2D, and is housed in the differential case 2E. The entirety of the sun gear 2C is formed of a cylindrical helical gear that has the axis that coincides with the rotational axis O. The sun gear 2C is configured to receive the rotational force from the gear portions 20B of the planetary gears 2B and output the rotational force to the output shaft in the left side of FIG. 1 (front wheel-side output shaft).

Straight splines 20C are formed in the inner peripheral face of the sun gear 2C. The straight splines 20C are used to connect the front wheel-side output shaft to the sun gear 2C in such a manner that the relative rotation between the sun gear 2C and the front wheel-side output shaft is prohibited.

Helical splines 21C are formed in the outer peripheral face of the sun gear 2C. The helical splines 21C form a moving force conversion portion 24 together with helical splines 22a of an intermediate member 5.

The pitch circle diameter D3 and the teeth number Z3 of the sun gear 2C are set to be greater than the pitch circle diameter D1 and the teeth number Z1 of each gear portion 20B of the planetary gear 2B, respectively.

The structure of the internal gear 2D will be described below. The internal gear 2D is formed of a boss portion 20D and a gear portion 21D, meshes with the gear portions 21B of the planetary gears 2B, is arranged so as to be rotatable on the rotational axis O of the differential case 2E, and is fitted to the rear case 21E of the differential case 2E with a ring bolt 105. The entirety of the internal gear 2D is formed of a cylindrical helical gear. The internal gear 2D is configured to receive the rotational force from the gear portions 21B of the planetary gears 2B and output the rotational force to the output shaft in the right side of FIG. 1 (rear-wheel side output shaft).

The boss portion 20D is arranged at such a position that the boss portion 20D faces the sun gear 2C via the planetary carrier 2A. The entirety of the boss portion 20D is formed of a cylindrical member that opens at its ends in the direction of the rotational axis O of the differential case 2E.

A rib portion 200D is formed on the outer peripheral face of the boss portion 20D. The rib portion 200D has a flange end face that faces the end face of the planetary carrier 2A, which is on opposite side of the sun gear-side end face of the planetary carrier 2A.

Straight splines 201D are formed in the inner peripheral face of the boss portion 20D. The straight splines 201D are used to connect the rear wheel-side output shaft to the boss portion 20D in such a manner that the relative rotation between the rear wheel-side output shaft and the boss portion 20D is prohibited.

The gear portion 21D meshes with the gear portions 21B of the planetary gears 2B, is arranged on the outer peripheral side of the planetary carrier 2A, and is formed integrally with the boss portion 20D of the internal gear 2D via the rib portion 200D.

The pitch circle diameter D4 and the teeth number Z4 of the gear portion 21D are set to be greater than the pitch circle diameter D3 and the teeth number Z3 of the sun gear 2C, respectively.

The structure of the differential case 2E will be described below. The differential case 2E is formed of an annular front case 20E that opens at both ends in the direction of the rotational axis O, and a cylindrical rear case 21E that is interposed between the front case 20E and the internal gear 2D. The differential case 2E is rotatably supported by a base 2 via a bearing 106, and is fitted to the internal gear 2D via the ring bolt 105. The entirety of the differential case 2E is formed of a hollow structural member that houses the differential mechanism 102 and the differential limiting mechanism 103 together with the internal gear 2D.

The front case 20E has a first case element 10, a second case element 11 and a third case element 13, is arranged at the base 2 side of the differential case 2E, and is fitted to the rear case 21E via a fitting bolt 107.

The first case element 10 has a cylindrical portion 10a that is inserted in the base 2 and a rib portion 10b that faces an armature 21 via a clutch mechanism 4, and is arranged on the inner peripheral side of the front case 20E. The entirety of the first case element 10 is formed of a cylindrical member made of magnetic material, for example, soft iron.

The second case element 11 is arranged on the outer peripheral side of the front case 20E. The entirety of the second case element 11 is formed of a cylindrical member that is made of magnetic material, for example, soft iron, as in the case of the first case element 10.

The third case element 12 is interposed between the first case element 10 and the second case element 11. The entirety of the third case element 12 is formed of an annular member that is used to connect case elements with each other, and that is made of non-magnetic material, for example, stainless steel.

The rear case 21E has the inner flange 210E interposed between the thrust washer 104 and the intermediate member 5, and is arranged between the differential mechanism 102 and the differential limiting mechanism 103.

The structure of the differential limiting mechanism 103 will be described below. The differential limiting mechanism 103 has an electromagnetic clutch 1 that limits the differential function of the differential mechanism 102, and is arranged between the inner peripheral face of the differential case 2E (rear case 21E) and the outer peripheral face of the sun gear 2C. The differential limiting mechanism 103 is configured to engage/disengage the sun gear 2C (differential case 2E) and the internal gear 2D with/from each other so that transmission of torque is permitted or interrupted.

The structure of the electromagnetic clutch 1 will be described below. The electromagnetic clutch 1 includes the fixing base 2, the differential case 2E that is rotatable relative to the base 2, a drive mechanism 3 that generates a clutch driving force in the differential case 2E, the clutch mechanism 4 that engages/disengages the sun gear 2C and the internal gear 2D, which are rotatable on the axis of the drive mechanism 3 (rotational axis O), with/from each other, and the intermediate member 5 that is movable toward the clutch mechanism 4.

The base 2 is arranged on the left side of the differential case 2E. The entirety of the base 2 is formed of a cylindrical member. The base 2 has a housing space 2a in which an electromagnetic coil 20 is housed.

The drive mechanism 3 has the electromagnetic coil 20 and the armature 21, and is arranged on the axis of the base 2 (rotational axis O). The drive mechanism 3 is configured to cause adjacent clutch plates among inner clutch plates 4a and outer clutch plates 4b (described later in detail) of the clutch mechanism 4 to push against each other so that the adjacent clutch plates frictionally slide with respect to each other during the rotation of the sun gear 2C and the internal gear 2D.

The electromagnetic coil 20 is housed in the housing space 2a of the base 2. The electromagnetic coil 20 is configured to form a magnetic circuit that lies astride the base 2, the armature 21 and the front case 20E and generate an electromagnetic force for applying a moving force to the armature 21 toward the front case 20E, when supplied with electric power.

The armature 21 is arranged between the clutch mechanism 4 and the intermediate member 5, and is housed in the front case 20E. The entirety of the armature 21 is formed of an annular plate made of magnetic material, for example, iron. The armature 21 is configured to receive an electromagnetic force from the electromagnetic coil 20, and move toward the clutch mechanism 4 along the rotational axis O of the differential case 2E.

The clutch mechanism 4 includes the inner clutch plates 4a that serve as first clutch plates that are frictionally engaged with each other due to the movement of the armature 21 caused by driving the drive mechanism 3, and the outer clutch plates 4b that serve as second clutch plates. The clutch mechanism 4 is arranged between the armature 21 and the front case 20E, and is housed in the rear case 21E. The adjacent clutch plates among the inner clutch plates 4a and the outer clutch 4b are frictionally engaged with each other or disengaged from each other so that the sun gear 2C and the internal gear 2D (differential case 2E) are engaged with each other or disengaged from each other.

The inner clutch plates 4a and the outer clutch plates 4b are alternately arranged along the rotational axis O of the differential case 2E. The entirety of each of the inner clutch plates 4a and the outer clutch plates 4b is formed of an annular friction plate.

Straight splines 40a are formed in the inner peripheral portions of the inner clutch plates 4a. The inner clutch plates 4a are arranged so as be movable along the rotational axis O of the differential case 2E. In addition, the straight splines 40a are meshed with straight splines 22b (described later in detail) of the intermediate member 5 in such a manner that the relative rotation between the inner clutch plates 4a and the intermediate member 5 is prohibited.

Straight splines 40b are formed in the outer peripheral portions of the outer clutch plates 4b. The outer clutch plates 4b are arranged so as be movable along the rotational axis O of the differential case 2E. In addition, the straight splines 40b are meshed with the straight splines 10b of the rear case 21E in such a manner that the relative rotation between the outer clutch plates 4b and the rear case 21E is prohibited.

The intermediate member 5 includes a base portion 22 and a rib portion 23, is arranged on the outer periphery of the sun gear 2C, and is housed in the differential case 2E. The entirety of the intermediate member 5 is made of non-magnetic material, for example, stainless. The intermediate member 5 is configured to receive the rotational force of the sun gear 2C and move toward the clutch mechanism 4.

The base portion 22 is formed of a cylindrical member that opens at its axial ends. The helical splines 22a that correspond to and mesh with the helical splines 21C of the sun gear 2C are formed in the inner peripheral face of the base portion 22. The straight splines 22b that correspond to the straight splines 40a of the inner clutch plates 4a are formed in the outer peripheral face of the base portion 22.

The helical splines 22a form the moving force conversion portion 24 together with the helical splines 21C, and convert the rotational force of the sun gear 2C into the moving force toward the clutch mechanism 4. The helical angle of the helical splines 22a is set to an angle (e.g. 45 degrees) at which the inner clutch plates 4a and the outer clutch plates 4b are not frictionally engaged with each other when the electromagnetic coil 20 is switched from the conduction state to the non-conduction state.

The helical angles of the helical splines 22a and 21C are changed as needed based on the number of clutch plates and the distance from the rotational axis O to the point at which the splines 22a and 21C are meshed with each other.

The rib portion 23 is interposed between the inner flange 210E of the rear case 21 and one end face (end face opposite to the clutch mechanism-side end face) of the armature 21, formed at one axial end portion of the intermediate member 5, and formed integrally with the outer peripheral face of the base portion 22. A pushing portion 23a is formed on the clutch mechanism-side end face of the rib portion 23. The pushing portion 23a pushes the armature 21 in such a direction that the inner clutch plates 4a and the outer clutch plates 4b are frictionally engaged with each other due to the movement of the intermediate member 5 toward the clutch mechanism 4.

Figure 3A:
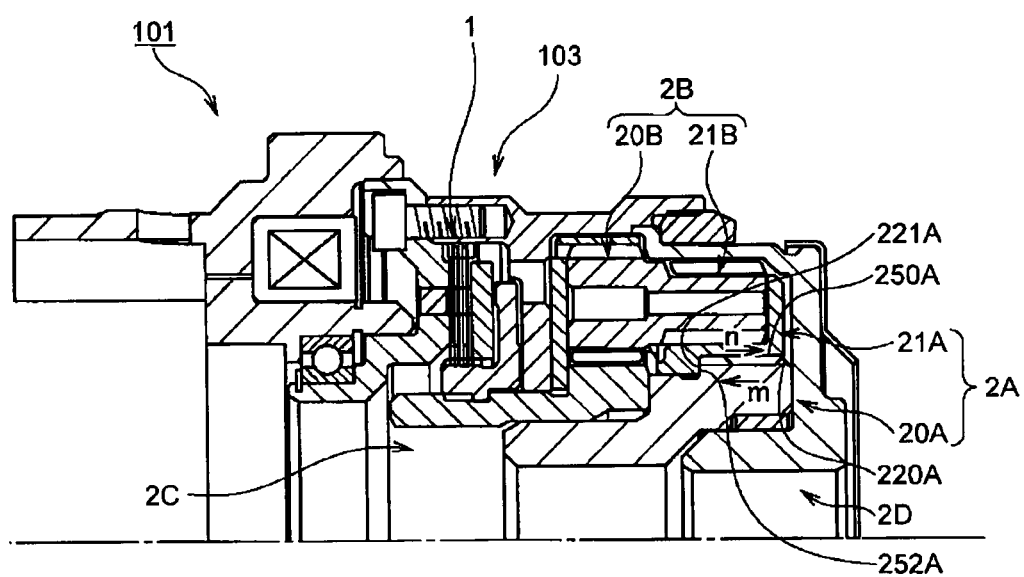
FIG. 3A is a cross-sectional view for describing an operation of the vehicle differential unit according to the embodiment of the invention when a vehicle is in the drive mode.
Figure 3B:
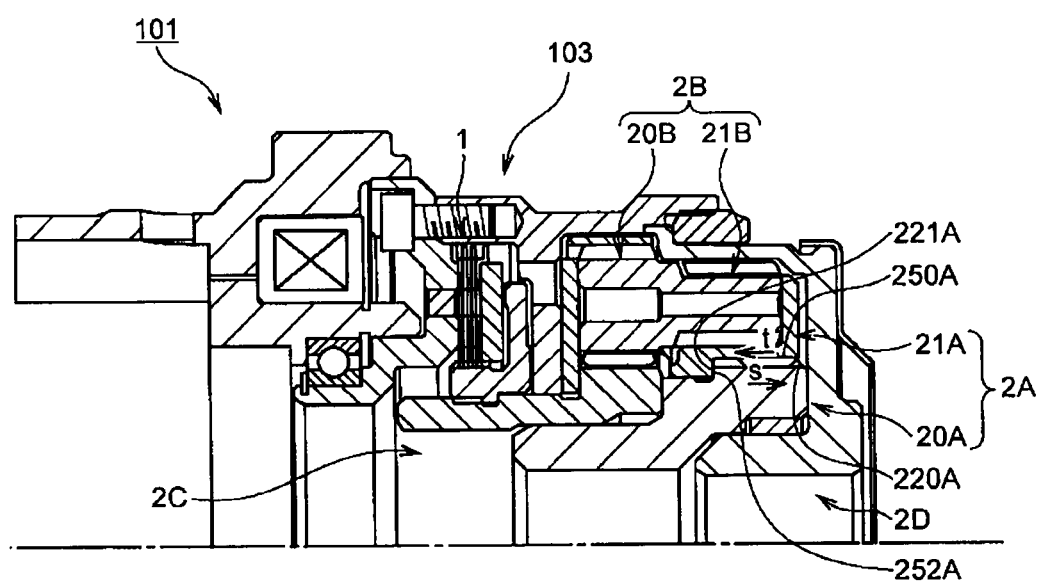
FIG. 3B is a cross-sectional view for describing an operation of the vehicle differential unit according to the embodiment of the invention when the vehicle is in the coast mode.

The operation of the vehicle differential unit 1 will be described with reference to FIG. 1 and FIGS. 3A and 3B. FIG. 3A shows the state where a thrust force is generated when the vehicle is in the drive mode. FIG. 3B shows the state where a thrust force is generated when the vehicle is in the coast mode.

As shown in FIG. 1, when the torque from the engine of the vehicle is input into the planetary carrier 2A, the planetary carrier 2A is rotated about the rotational axis O. When the planetary carrier 2A is rotated, the rotational force is transmitted to the planetary gears 2B, and is then transmitted from the gear portions 20B of the planetary gears 2B to the sun gear 2C and from the gear portions 21B of the planetary gears 2B to the internal gear 2D. In this case, because the sun gear 2C is splined to the front wheel-side output shaft and the internal gear 2D is splined to the rear wheel-side output shaft, the torque from the engine is transmitted to the planetary carrier 2A and the planetary gears 2B and then transmitted to the right and left (front wheel-side and rear wheel-side) output shafts via the sun gear 2C and the internal gear 2D.

In the case where the vehicle travels straight and a slip does not occur between each of the front and rear wheels and the road surface, if the torque from the engine is transmitted to the planetary carrier 2A, the planetary carrier 2A rotates about the rotational axis O, the planetary gears 2B revolve around the axis of the sun gear 2C and the internal gear 2D without rotating about their axes, and the planetary gears 2B, the sun gear 2C and the internal gear 2D rotate together with the planetary carrier 2A. Therefore, the torque from the engine is distributed to each of the front and rear output shafts at a distribution ratio within a range of differential limiting torque distribution ratio at the time of static friction, using the distribution ratio of D3/D1 (front): D4/D2 (rear) as the reference distribution ratio, so that unbalanced reaction force from the road surface is instantaneously accommodated. Therefore, the torque from the engine is transmitted to each of the front and rear output shafts without loss. As a result, the output shafts rotate at the same rotational speed.

On the other hand, when a slip occurs between one of the front and rear wheels of the vehicle and the road surface, a differential limiting torque is generated at the output gears (the sun gear 2C and the internal gear 2D) due to the effects 1) and 2) described below in the state where the engine torque is input in the planetary carrier 2A.

1) If the planetary gears 2B rotate about their axes with the torque input therein, the tooth tip faces of the planetary gears 2B (the gear portions 20B and the gear portions 21B) slide with respect to the first gear support faces 202a and the second gear support faces 203a (which define the first housing holes 200a and the second housing holes 201a) of the planetary carrier 2A, and a frictional resistance is generated between the first gear support faces 202a and the second gear support face 203a, and the tooth tip faces of the planetary gears 2B. Then, a differential limiting torque is generated at the sun gear 2C and the internal gear 2D due to the frictional resistance.

Also, a thrust force along the rotational axis O is generated at the gear meshing faces of the gears (the planetary gears 2B, the sun gear 2C and the internal gear 2D) due to rotation of the planetary gears 2B with the torque input therein. In this case, the axial end faces of the planetary gears 2B (gear portions 21B) slide with respect to the third gear support faces 204a (which define the second housing holes 201a) of the planetary carrier 2A, or slide with respect to the inner flange 210E of the rear case 21E via the thrust washer 104. At this time, a frictional resistance is generated between the sliding portions, and a differential limiting torque is generated at the sun gear 2C and the internal gear 2D due to the frictional resistance as well.

In the embodiment of the invention, the planetary carrier 2A includes the thrust force generation portion that generates a thrust force along the rotational axis O and the relative movement limiting portion that limits the relative movement between the cylindrical members 20A and 21A along the rotational axis O due to the thrust force when the vehicle is in the drive mode.

Therefore, if a thrust force along the direction of an arrow m shown in FIG. 3A is generated at the cylindrical member 20A and a thrust force along the direction of an arrow n shown in FIG. 3A is generated at the cylindrical member 21A in the thrust force generation portion when the vehicle is in the drive mode, the cylindrical members 20A and 21A are moved in such a direction that the first contact face 252A and the second contact face 221A are pushed against each other in the relative movement limiting portion, whereby the relative movement between the cylindrical members 20A and 21A is limited. Thus, it is possible to cancel the effect of increasing the differential limiting torque due to the thrust force along the rotational axis O that is generated at each of the gears (the planetary gears 2B, the sun gear 2C and the internal gear 2D). Accordingly, it is possible to suppress an increase in the bias of the vehicle when the vehicle is in the drive mode, and it is possible to make bias adjustment that is limited to the drive mode.

On the other hand, if a thrust force along the direction of an arrow s shown in FIG. 3B is generated at the cylindrical member 20A and a thrust force along the direction of an arrow t shown in FIG. 3B is generated at the cylindrical member 21A in the thrust force generation portion when the vehicle is in the coast mode, the cylindrical members 20A and 21A are moved in such a direction that the first contact face 252A and the second contact face 221A are moved apart from each other in the relative movement limiting portion, whereby the relative movement between the cylindrical members 20A and 21A is not limited. Thus, with the use of the thrust force that is generated between the helical splines 220A and 250A, it is possible to obtain the effect of increasing the differential limiting torque due to the thrust force along the rotational axis O that is generated at each of the gears (the planetary gears 2B, the sun gear 2C and the internal gear 2D).

2) If electric power is supplied to the electromagnetic coil 20 of the drive mechanism 3, the magnetic circuit that lies astride the base 2, the front case 20E, the rear case 21E and the armature 21 is formed, and the armature 21 is moved toward the electromagnetic coil (base 2) by the electromagnetic force. Due to the movement of the armature 21, the differential limiting mechanism 3 (the inner clutch plates 4a and the outer clutch plates 4b of the clutch mechanism 3) are pushed toward the base 2. As the differential limiting mechanism 3 is pushed toward the base 2, the inner clutch plates 4a and the outer clutch plates 4b approach relative to each other, and are frictionally engaged with each other.

In this case, a primary clutch force is generated between the inner clutch plates 4a and the outer clutch plates 4b due to the frictional engagement of the inner clutch plates 4a and the outer clutch plates 4b. Due to the primary clutch force, the differential case 2E and the sun gear 2C, that is, the sun gear 2C and the internal gear 2D are connected with each other via the inner clutch plates 4a and the outer clutch plates 4b in such a manner that torque is transmitted therebetween. Thus, a differential limiting torque is generated at the sun gear 2C and the internal gear 2D.

If the planetary carrier 2A is rotated in the direction shown by an arrow in FIG. 1 due to the drive torque from the drive source (not shown) when the vehicle is in the drive mode, the sun gear 2C and the internal gear 2D receive a primary generation torque based on the distribution ratio of D4/D2:D3/D1. In this case, a thrust force toward the planetary carrier 2A is applied to the sun gear 2C and a thrust force toward the armature 21 is applied to the intermediate member 5 in the moving force conversion portion 24 (helical splines 22a and 21C) of the intermediate member 5. The magnitude of the thrust force applied to the sun gear 2C and the magnitude of the thrust force applied to the intermediate member 5 are proportional to the respective magnitudes of the primary generation torque.

Thus, the rotational force of the sun gear 2C is converted into the moving force toward the clutch mechanism 4 at the moving force conversion portion 24, and the intermediate member 5 is moved toward the clutch mechanism 4 by the moving force. Then, the pushing portion 23a pushes the armature 21 in such a direction that the inner clutch plates 4a and the outer clutch plates 4b are frictionally engaged with each other, and a secondary clutch force is generated when the armature 21 is pushed. Thus, the sun gear 2C and the internal gear 2D receive the secondary generation torque based on the distribution ratio of D4/D2:D3/D1 via the clutch mechanism 4 and the intermediate member 5. The sun gear 2C and the internal gear 2D receive the torque that has been amplified by repeatedly performing the above-described cycle. As a result, it is possible to offset a shortage of the differential limiting torque that occurs when the vehicle is in the drive mode.

According to the embodiment of the invention described above, it is possible to obtain the following effects.

1) The relative movement between the cylindrical members 20A and 21A is limited in the planetary carrier 2A when the vehicle is in the drive mode, and it is possible to cancel the effect of increasing the differential limiting torque due to the thrust force that is generated at each of the gears (the planetary gears 2B, the sun gear 2C and the internal gear 2D). Thus, it is possible to suppress an increase in the bias of the vehicle, and it is possible to make bias adjustment that is limited to the drive mode.

2) In the differential limiting mechanism 103, it is possible to increase the clutch capacity and obtain a sufficiently large clutch force without increasing the number of the inner clutch plates 4a and the number of the outer clutch plates 4b. Therefore, it is possible to offset a shortage of the differential limiting torque that occurs when the vehicle is in the drive mode.

The electromagnetic clutch according to the embodiment of the invention has been described above. However, the invention is not limited to the above-described embodiment, and the invention may be implemented in various other embodiments within the scope of the invention. For example, the following modifications may be made.

1) In the embodiment described above, the relative movement between the cylindrical members 20A and 21A of the planetary carrier 2A is limited when the vehicle is in the drive mode so that the bias adjustment that is limited to the drive mode is made. However, the invention is not limited to the embodiment described above. The relative movement between the cylindrical members of the planetary carrier may be limited when the vehicle is in the coast mode so that the bias adjustment that is limited to the coast mode is made.

2) In the embodiment described above, the planetary carrier 2A that serves as the support member is formed of a plurality of separate elements (two cylindrical members 20A and 21A). However, the invention is not limited to the embodiment described above. The sun gear that serves as the second gear member or the internal gear that serves as the third gear member may be formed of a plurality of separate elements. Each of the planetary carrier and the sun gear may be formed of a plurality of separate elements. Alternatively, each of the sun gear and the internal gear may be formed of a plurality of separate elements. Further alternatively, each of the internal gear and the planetary carrier may be formed of a plurality of separate members. Further alternatively, each of the planetary carrier, the sun gear and the internal gear may be formed of a plurality of separate elements. That is, according to the invention, at least one of the support member, the second gear member and the third gear member is formed of a plurality of separate elements.

3) In the embodiment described above, the sun gear 2C and the internal gear 2D mesh with each planetary gear 2B at two respective positions in the axial direction of the planetary gear 2B. However, the invention is not limited to the embodiment described above. The first gear member may be formed of a pair of planetary gears that mesh with each other, and the planetary gears may mesh with a pair of sun gears that serve as the first output member and the second output member.

4) In the embodiment described above, the planetary carrier 2A serves as the input member, the sun gear 2C serves as the first output member (first output-side gear), and the internal gear 2D serves as the second output member (second output-side gear). However, the invention is not limited to the embodiment described above. The planetary carrier may serve as the input member, the internal gear may serve as the first output member, and the sun gear may serve as the second output member. Alternatively, the sun gear may serve as the input member, the internal gear or the planetary carrier may serve as the first output member, and the planetary carrier or the internal gear may serve as the second output member. Further alternatively, the internal gear may serve as the input member, the planetary carrier or the sun gear may serve as the first output member, and the sun gear or the planetary carrier may serve as the second output member.

5) In the embodiment described above, the positions at which the sun gear 2C and the internal gear 2D mesh with each of the plurality of planetary gears that serve as the first gear members are offset from each other in the axial direction and in the radial direction. Alternatively, each of the planetary gears may have a cylindrical shape, and each of the planetary gears may mesh with the internal gear at a position on the radially outer side of the position at which the planetary gear meshes with the sun gear with respect to the rotational axis O.

What is claimed is:

1. A vehicle differential unit comprising:
    a first gear member rotatably supported by a support member formed of a rotatable member; and
    a second gear member and a third gear member that mesh with the first gear member, and that distribute a driving force from a drive source of a vehicle to a pair of output shafts via the first gear member, the second gear member, the third gear member, and the support member, wherein the support member is formed of a plurality of separate elements that are able to rotate relative to each other on an axis of the pair of output shafts, wherein
    the plurality of separate elements of the support member define a helical spline that receives the driving force and generates a thrust force in one direction or another direction parallel to the axis of the pair of output shafts between the plurality of elements, in response to a relative rotation; and
    a relative movement limiting portion that limits a relative movement between at least two adjacent elements among the plurality of elements in the one direction parallel to the axis of the pair of output shafts, due to the thrust force when the vehicle is in one of a drive mode and a coast mode, but does not limit the relative movement between the at least two adjacent elements among the plurality of elements in the another direction parallel to the axis of the pair of output shafts, due to the thrust force when the vehicle is in the other of a drive mode and a coast mode,
    wherein the relative movement limiting portion comprises a first contact face and a second contact face that contact each other when the relative movement between the at least two elements in the one direction is limited by the relative movement limiting portion; and
    the first contact face is formed in one of the at least two elements, and the second contact face is formed in the other element.

2. The vehicle differential unit according to claim 1, wherein:
    the first gear member is formed of an input-side gear;
    the second gear member is formed of a first output-side gear that is connected to one of the pair of output shafts; and
    the third gear member is formed of a second output-side gear that is connected to the other of the pair of output shafts.

3. The vehicle differential unit according to claim 2, wherein:
    the input-side gear is formed of a planetary gear;
    the first output-side gear is formed of a sun gear; and
    the second output-side gear is formed of an internal gear.

4. The vehicle differential unit according to claim 3, wherein:
    the planetary gear has large and small gear portions that have different pitch circle diameters;
    the gear portion that has a larger diameter among the large and small gear portions meshes with the sun gear; and
    the gear portion that has a smaller diameter among the large and small gear portions meshes with the internal gear.

5. The vehicle differential unit according to claim 4, wherein
    the large and small gear portions are formed of helical gears having the same helical direction.

* * * * *